United States Patent [19]
Natman et al.

[11] 3,886,619
[45] *June 3, 1975

[54] DEFLECTING HAIRBRUSH

[75] Inventors: Solomon Natman, Brooklyn; Robert A. Cohen, Kew Gardens, both of N.Y.

[73] Assignee: Stance Industries Inc., Brooklyn, N.Y.

[ * ] Notice: The portion of the term of this patent subsequent to June 19, 1990, has been disclaimed.

[22] Filed: Mar. 26, 1973

[21] Appl. No.: 344,612

Related U.S. Application Data

[63] Continuation-in-part of Ser. No. 95,477, Dec. 7, 1970, Pat. No. 3,739,419.

[52] U.S. Cl. ................................................. 15/187
[51] Int. Cl. ........................... A46b 1/00; A46b 5/00
[58] Field of Search .......... 15/110, 114, 159 R, 172, 15/180, 186–188, 201, 202, 402; 128/62 R, 65–67; 132/85; 401/289, 291, 28

[56] References Cited
UNITED STATES PATENTS

| | | | |
|---|---|---|---|
| 757,791 | 4/1904 | Woud | 401/28 |
| 2,231,003 | 2/1941 | Fois | 15/396 |
| 2,482,928 | 9/1949 | Neff et al. | 15/186 X |
| 2,516,491 | 7/1950 | Swastek | 128/62 R X |
| 2,722,031 | 11/1955 | Bressler | 15/201 |
| 3,651,532 | 3/1972 | Wettburg | 15/186 |
| 3,739,419 | 6/1973 | Natman et al. | 15/201 |

FOREIGN PATENTS OR APPLICATIONS

| | | | |
|---|---|---|---|
| 17,156 | 7/1897 | United Kingdom | 15/193 |
| 726,209 | 3/1955 | United Kingdom | 15/201 |
| 13,964 | 3/1926 | Netherlands | 15/171 |

*Primary Examiner*—Daniel Blum
*Attorney, Agent, or Firm*—Yuter & Rosen

[57] ABSTRACT

A hairbrush includes a plurality of flexible concentric rings supporting bristles or teeth. The flexible concentric rings are flexibly connected by flexible hinges which allow the rings to deflect away from the direction of brushing. The teeth carried by the concentric rings are stiff, allowing deep penetration of the hair. The flexibly mounted concentric rings allow the stiff teeth to easily slip past any snags or knots encountered in the hair by deflecting away from the direction of brushing.

16 Claims, 11 Drawing Figures

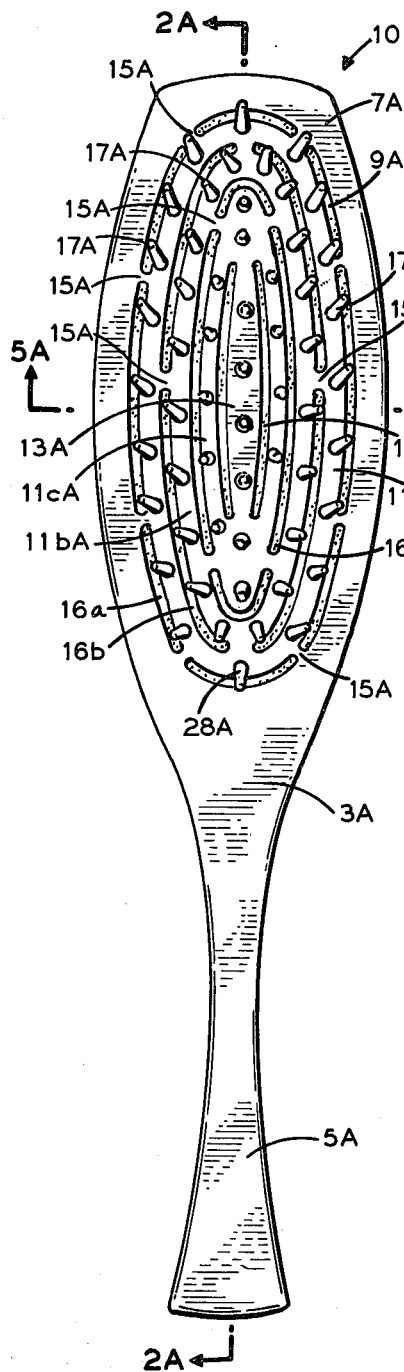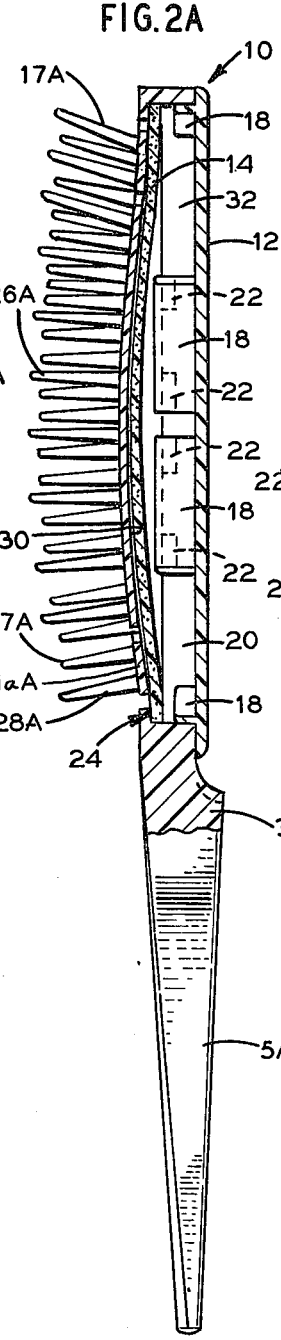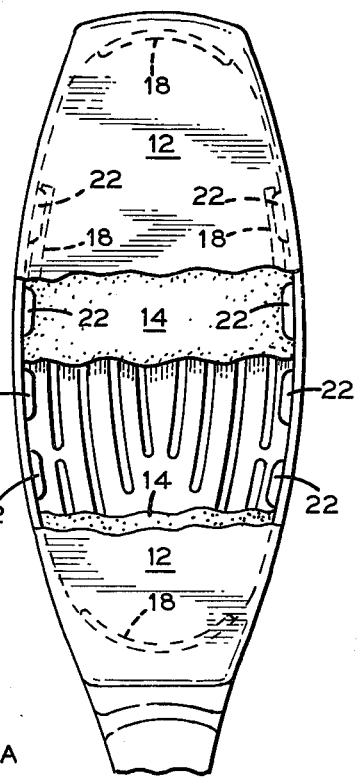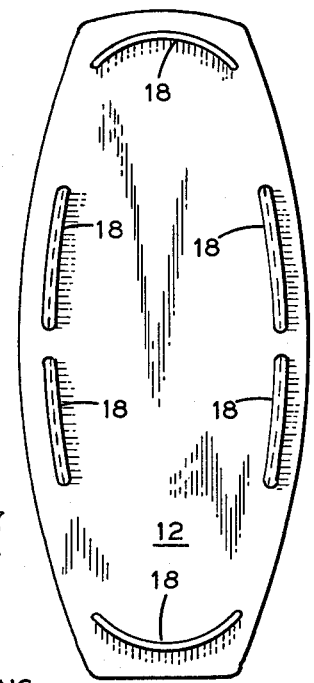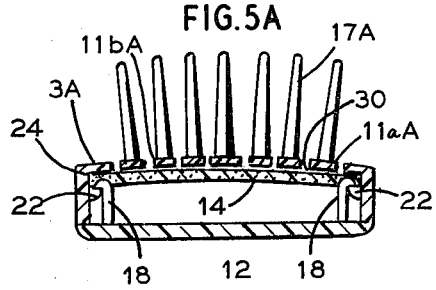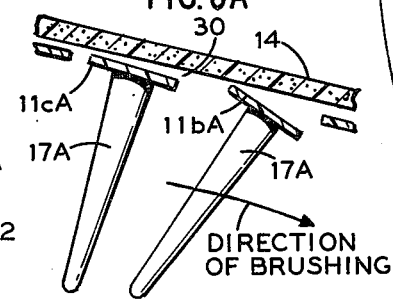

DEFLECTING HAIRBRUSH

CROSS-REFERENCE TO RELATED APPLICATION

This application is a continuation-in-part of a pending parent application of the same inventors, Ser. No. 95,477, filed Dec. 7, 1970, which issued as U.S. Pat. No. 3,739,419 on June 19, 1973, for a Non-Snagging Hairbrush.

The invention claimed herein is a hairbrush comprising a unique teeth deflection feature which is disclosed but not claimed in the parent application. The teeth deflection feature comprises stiff teeth mounted on flexible concentric rings which are separated by elongated slots. The flexible concentric rings are flexibly connected together by flexible hinges causing the concentric rings to deflect away from the direction of brushing when the stiff teeth engage snags in the hair.

The new matter relates to an improvement (see FIGS. 1A–6A on sheet 1 of the drawings) of the invention disclosed in the parent application (in FIGS. 1–5 which correspond to FIGS. 7A–11A of this application).

BACKGROUND OF THE INVENTION

1. FIELD OF THE INVENTION

This invention relates to a new and useful improvement in brushes, and more particularly to hairbrushes having stiff bristles (teeth) for deep hair penetration.

2. Prior Art

The basic criteria of good hairbrush design has been known for a substantial period. One goal is to manufacture a brush which deeply penetrates the hair. This facilitates the brushing of all the hair, both the hair that is located near the surface and that which is located near the scalp and in the interior. Further, since more hair is brushed with each stroke, deep penetration results in less time being required to brush the hair.

Another goal of good hairbrush design is a brush having bristles which easily slip past knots and snags in the hair. Fulfillment of this goal is especially true of brushes designed for wigs and other artificial hair. If a bristle does not slip by a snag or knot, in the case of a wig, there is a strong possibility that the hair will be pulled from the base in which it is mounted. In the case of natural hair, a bristle catching a snag or knot will undoubtedly cause pain to the individual whose hair is being brushed.

The prior art has met these goals with various techniques. Brushes with stiff bristles were constructed. These brushes easily and deeply penetrated the hair. However, when they encountered a snag or knot, they engaged the snag or knot and pulled on the hair.

Another solution was constructing brushes with flexible bristles. Although these brushes slipped easily past snags and knots, their brushing action was inadequate. They did not penetrate the hair. Further, during normal brushing encounters with tangled hair, rather than brushing out the entanglement, they slipped by. Thus, many brush strokes of the hair were necessary before the hair was adequately brushed.

Still another brush in the prior art combined stiff bristles with a flexible carrier plate. These bristles were made of a stiff metal such as spring steel and were mounted in a flexible rubber carrier plate. The stiff metal bristles allowed deep penetration of the hair, while the flexible rubber carrier plate allowed the stiff bristles to bend at their base. This latter action allowed the stiff bristles to slip by snags and knots in the hair. Although this brush met the basic goals of hairbrush design, it had many practical shortcomings. Manufacture of metal bristles mounted in a flexible rubber carrier plate is expensive and not easily automated. Therefore, the cost of this brush has kept it out of the reach of the greater portion of the population. Further, the mounting of the metal bristle in the flexible rubber carrier plate has given rise to many problems. First, the stiff metal has caused the bond between the metal and the rubber to wear, allowing the metal bristles to be pulled out of the rubber carrier plate in due course. Second, the metal has been subject to corrosion as well as to fatigue resulting in the metal elements rupturing in normal use.

Another brush in the prior art has attempted to improve upon the shortcomings of the brush described immediately above. This brush has replaced the metal bristles with nylon bristles. Although this obviates the corrosion problems, the problem of bonding the bristles to the rubber and the fatigue problem of the nylon still exists. Although this brush is slightly less expensive because of the nylon bristles, its normal life expectancy is shorter. Nylon can fatigue more quickly and bonding the nylon bristles to the rubber carrier plate is more difficult.

It is therefore an object of this invention to provide an improved hairbrush with deep penetration and the ability to slip past snags and knots in the hair.

It is another object of this invention to provide an improved hairbrush that has stiff bristles and a flexible carrier plate.

It is a further object of this invention to provide a hairbrush which fulfills the above two objects and is inexpensive to manufacture and has a long life expectancy.

The invention of the parent application, while also accomplishing these objects, created a demand for an even less expensive hairbrush with an even greater ability to slip past snags and knots in the hair. That demand is satisfied by the present invention.

SUMMARY OF THE INVENTION

The above objects are met by the present invention. The haribrush of the present invention has a plurality of flexible concentric rings forming carrier plates which are separated by annulor slots. Flexible hinges bridging the annular slots flexibly connect adjacent concentric rings. Stiff bristles or teeth are mounted on the flexible concentric rings. The stiff teeth can deeply penetrate the hair but easily slip past snags and knots in the hair which they encounter by deflection away from the direction of brushing.

The preferred embodiment of the present invention has additional features. Both the bristles and the concentric rings upon which the bristles are mounted, together with a hand-held support member, are molded from the same material. This molding can be performed in one step. This manufacturing process greatly reduces the cost of the brush.

Further, the hairbrush of the preferred embodiment is preferably molded from polypropylene containing about ten percent oleic acid by weight. This composition produces a smooth "lubricated" surface which facilitates the bristles slipping past snags and knots.

In addition to the above features, the preferred embodiment has a flexible backing material mounted beneath but spaced from the concentric rings. This spacing enhances the deflection of the flexible concentric rings when a knot or snag is encountered. A removable back plate mounted in an opening in the rear of the hand-held support member permits the inexpensive insertion of the flexible backing material, further reducing the cost of manufacture.

Other objects, features and advantages of the various aspects of the invention will be apparent from the following detailed description when read with the accompanying drawings. These drawings show, by way of example and not limitation, structure for practicing the invention.

BRIEF DESCRIPTION OF THE DRAWINGS

FIG 1A (sheet 1 of the drawing) is a front plan view of a hairbrush in accordance with the preferred embodiment of the invention, showing the flexible concentric rings interconnected by flexible hinges.

FIG. 2A is a sectional side view of the hairbrush of FIG. 1A, taken along line 2A-2A of FIG. 1A, showing the stiff teeth mounted on the flexible concentric rings with a back plate removably mounted in an opening in the rear.

FIG. 3A is a front plan view of the inside of the back plate of the hairbrush shown in FIG. 2A.

FIG. 4A is a rear plan view of the hairbrush partially in section.

FIG. 5A is a cross-sectional view of the hairbrush taken along the line 5A—5A of FIG. 1A.

FIG. 6A is a partial sectional view through the teeth portion of the hairbrush of FIG. 1A, illustrating the flexible nature and rotational freedom of the concentric rings.

EARLIER EMBODIMENT OF THE DESCRIPTION OF THE INVENTION

Figure 7A:
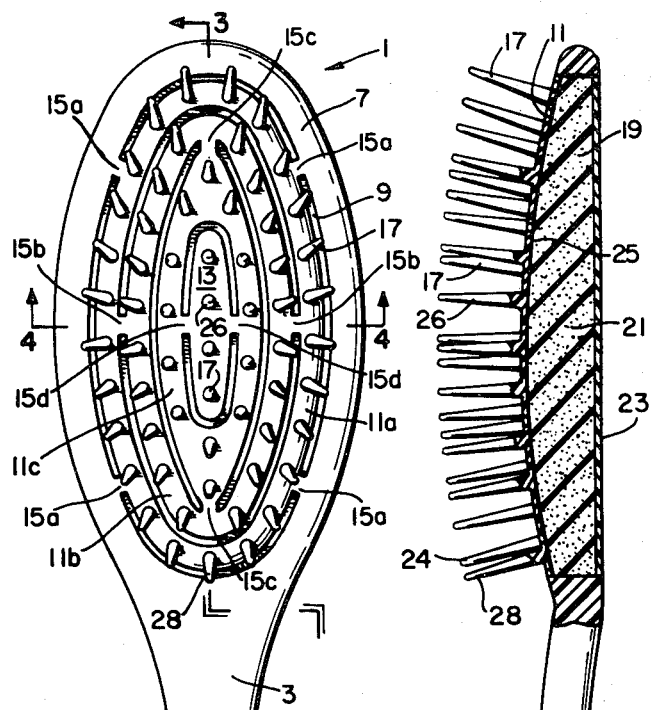
FIG. 7A (sheet 2 of the drawing) is a top plan view of the hairbrush in accordance with an earlier embodiment of the invention, viewed when the hairbrush is lying on its back.

Referring to FIG. 7A, a hairbrush 1 of the earlier embodiment of the invention can be seen. The hairbrush includes a base 3. Base 3 comprises a handle portion 5 and a carrier plate support 7. In the preferred embodiment the base 3 is composed of polypropylene with 10 percent oleic acid by weight.

The carrier plate support 7 has an elliptical opening 9. Included within the elliptical opening 9 is a plurality of concentric rings 11. Within the central elliptical ring 11c, there is a solid ellipse 13. Although the concentric rings are elliptical in the earlier embodiment, the invention is not so limited.

In the earlier embodiment as shown in FIG. 7A, hinges 15a connect the outer concentric ring 11a with the carrier plate support 7. As shown in FIG. 7A, there are four hinges 15a each located approximately 45° from the major and minor axis of elliptical opening 9. Hinges 15a allow outer concentric rings 11a only one degree of freedom of motion. That is, outer concentric ring 11a has freedom of motion only in the direction perpendicular to the plane of FIG. 7A, in and out of the plane of the paper.

With respect to the other concentric rings, two hinges are contrapositionally mounted flexibly connecting two adjacent concentric rings. These hinges connecting a first pair of concentric rings are displaced substantially 90° from the hinges connecting a third concentric ring to an adjacent one of said first pair of concentric rings. That is, hinges 15b are contrapositionally arranged to each other along the minor axis of elliptical opening 9 and flexibly connect concentric rings 11a and 11b. Hinges 15c are contrapositionally mounted along the major axis of elliptical opening 9, flexibly connecting the two adjacent concentric rings 11b and 11c. Hinges 15d are contrapositionally mounted along the minor axis of elliptical opening 9, flexibly connecting the two adjacent concentric rings, concentric ring 11c and solid ellipse 13. Although hairbrush 1 of FIG. 7A shows three concentric rings 11a–c and one solid ellipse 13, one skilled in the art realizes that solid ellipse 13 could also be a concentric ring, with or without concentric rings in its interior. Depending on context throughout this specification solid ellipse 13 will be referred to as a solid ellipse or as a concentric ring.

In addition, the two hinges comprising a set of hinges contrapositionally mounted flexibly connecting a first pair of concentric rings are displaced substantially 90° from the hinges connecting a third concentric ring to an adjacent one of said first pair of adjacent concentric rings. For example, hinges 15c are contrapositionally mounted flexibly connecting a first pair of adjacent concentric rings 11b and 11c and are displaced 90° from the hinges 15b connecting third concentric ring 11a to adjacent concentric ring 11b of said first pair of concentric rings 11b and 11c.

Stiff bristles 17 are mounted upon concentric rings 11 and solid ellipse 13. In the preferred embodiment, stiff bristles 17, hinges 15, solid ellipse 13, concentric rings 11, and base 3 including handle 5 and carrier plate support 7 are molded of the same material during the same step. That is, they all comprise polypropylene with about 10 percent of oleic acid by weight.

Figure 9A:
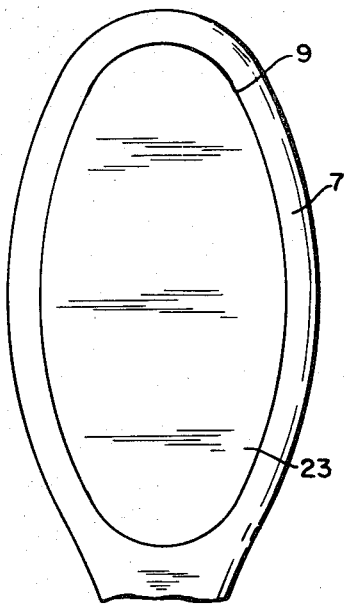
FIG. 9A is a side sectional view taken along line 3–3 in FIG. 7A.
Figure 8A:
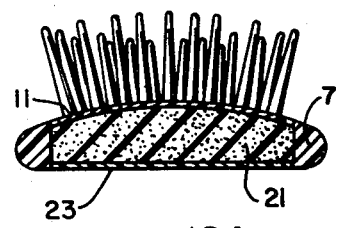
FIG. 8A is a rear plan view of the hairbrush of FIG. 7A.

Referring to FIG. 9A, another feature of the hairbrush according to the earlier embodiment of the invention can be seen. A backing 19 is placed behind concentric rings 11 which form a carrier plate for bristles 17. Backing 19 is formed from a sponge-like material 21 mounted over a non-flexible backing 23.

Stiff bristles 17, which are mounted on the more inner of concentric rings 11, have their extremities 24 (FIG. 9A) at a higher altitude than stiff bristles 17 which are mounted on the more outer concentric rings 11. For example, stiff bristle 26 on solid ellipse 13 has its extremity 24 at a higher altitude than the extremity 24 of bristle 28 on concentric ring 11a.

Figure 10A:
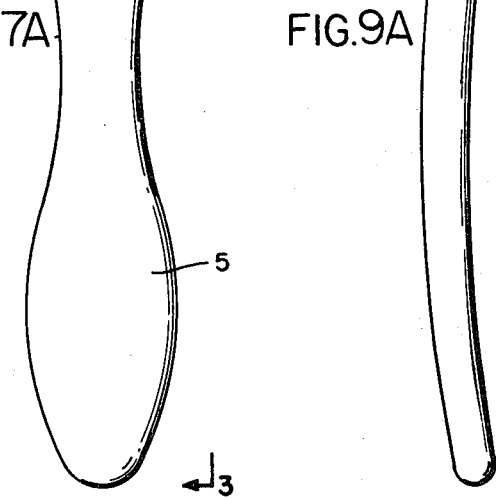
FIG. 10A is a sectional view taken along line 4–4 in FIG. 7A.

As can be best seen from FIG. 10A, the sponge-like material 21 is contoured to support each next concentric ring 11 at such a higher altitude to give the bristles a dome effect. Non-flexible backing 23 limits the movement of concentric ring 11 and solid ellipse 13 to prevent the stiff bristles 17 mounted upon a concentric ring 11 from snagging upon another concentric ring 11.

In the earlier embodiment the sponge-like material 21 can be covered with an impervious layer 25 (FIG. 9A). Impervious layer 25 prevents the sponge-like material 21 from absorbing water if the hairbrush were accidentally dropped into water. Also, by correctly proportioning the amount of sponge-like material 21 with relation to the overall weight of hairbrush 1, hairbrush 1 can be structured to float when dropped into water. Of course, this is aided if the handle portion 5 of hairbrush is hollow.

OPERATION

The combination of the stiff bristles and the relatively movable concentric rings allows the brush of the earlier embodiment of the invention to deeply and easily penetrate the hair while slipping past knots and snags. As can be seen from FIG. 7A, the outermost concentric ring 11a has only 1° of freedom of motion. That is, its freedom of motion is perpendicular to the plane of the paper. The second outermost ring 11b has 2° of freedom of motion, i.e., perpendicular to the plane of the paper and rotational about the minor axis of elliptical opening 9. The third outermost ring 11c and all the more innermost rings and solid ellipse 13 have 3° of freedom of motion, i.e., perpendicular to the plane of the paper, rotational about minor axis of elliptical opening 9 and rotational about the major axis of elliptical opening 9.

Thus, if any of the stiff bristles 17 of the inner concentric rings 11 encounter a snag or knot in hair, the bristle 17 moves the concentric ring 11 around the hinges 15 upon which it is mounted in a one or more directions of its degrees of freedom. Since the outer concentric rings do not have as many degrees of freedom as the inner concentric rings, they do not as easily slip by snags or knots. Thus, these outer concentric rings can be used to brush out the more difficult entanglements of the hair.

Further, as is especially recognized from FIG. 10A, the dome effect imparted to bristles 17 by the contoured shape of sponge-like material 21 insures that the stiff bristles 17 mounted on the inner concentric rings penetrate more deeply into the hair than the stiff bristles 17 mounted on the outer concentric rings 11. Since the more deeply penetrating stiff bristles 17 which have a great deal of freedom of motion are more likely to encounter unexpected snags or knots, they can easily slip by snags and knots. This contrasts to the stiff bristles 17 mounted on the outer concentric rings 11 which do not have as much freedom of motion. They will encounter snags and knots more easily seen and can be selectively utilized to remove those snags and knots.

Figure 11A:
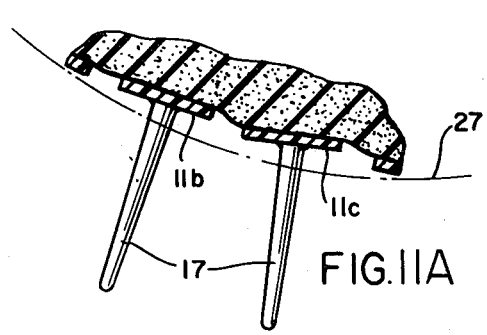
FIG. 11A is a partial sectional view through the bristle portion of the hairbrush of the earlier embodiment illustrating the flexible nature and rotational freedom of the concentric rings.

The rotational action of hairbrush 1 of the earlier embodiment of the invention can be seen in FIG. 11A. Line 27 is the contour upon which concentric rings 11b and 11c normally rest. Upon encountering a snag or knot in the hair, bristles 17 deform from the normal position of concentric rings 11b and 11c to that shown by way of example in FIG. 11A. In this manner stiff bristles 17 "slip by" any snags and knots.

Some of the other features of the earlier embodiment of the invention can also easily be recognized from the above description. For example, since the entire structure including base 3, handle 5, carrier plate support 7, concentric rings 11, solid ellipse 13, hinges 15, and stiff bristles 17 are molded out of the same material, and at the same time, manufacturing costs are substantially reduced over other manufacturing techniques. Further, there is no problem mounting bristles 17 upon their carrier plates, concentric rings 11. There can be neither corrosion (stiff bristles 17 are made of plastic), fatigue (stiff bristles 17 are extremely stiff and have relatively little flex), nor wear at the junction between stiff bristles 17 and the concentric rings 11 (they are integrally molded). Yet, the desirable action of penetrating deeply and easily slipping past snags and knots is attained.

Those skilled in the art will easily see the variations upon the basic invention of the earlier embodiment. For example, the material of propylene with ten percent by weight of oleic acid to provide a self-lubricating structure to facilitate the bristles slipping past knots and snags can be modified without changing the basic desirability of a self-lubricating surface. Further, although the inner hinges 15 are mounted 90 degrees with respect to the hinged section joining adjacent concentric rings, this mointing difference can be varied in accordance with the amount and the degrees of freedom of motion that the carrier plates, concentric rings 11, are to have. Also, the degree of contour to sponge-like material 21 can be varied to different advantages or achieved by varying the length of stiff bristles 17.

DESCRIPTION OF THE PRESENT EMBODIMENT OF THE INVENTION

The present embodiment of the invention (FIGS. 1A–6A), which is an improvement over the earlier embodiment of the invention (FIGS. 7A–11A), differs from the earlier embodiment principally as follows: The present embodiment has:(a) 18 flexible hinges connecting the teethsupporting flexible concentric rings instead of 10 hinges; (b) spacing behind the flexible concentric rings to provide for easier and increased teeth deflection upon encountering snags in the hair; (c) a removable back plate; and (d) a pad removably mounted between and spaced from both the back plate and the flexible concentric rings.

The present embodiment of the invention is an improvement over the earlier embodiment principally in being of a much less expensive construction and in providing even greater ability for the teeth to slip past snags and knots in the hair in a direction away from the direction of brushing because of increased rotation of the flexible concentric rings by virtue of the spacing between the rings and the pad. The increase in the number of hinges from 10 to 18 increases the stability of the concentric rings to increase the efficiency of brushing in the direction of brushing.

Except for the principal differences indicated above, the elements of the present embodiment are generally the same and have the same characteristics as the elements of the earlier embodiment, so that similar elements of the present embodiment are identified with the same reference characters as corresponding elements of the earlier embodiment, but with an "A"added. Accordingly, only the principal differences will be described in detail.

The hairbrush 10 (FIG. 1A) generally comprises a base 3A having a handle 5A and a carrier plate support 7A; a removable back plate 12 (FIGS. 2A, 3A, 5A); and a removable foam pad 14. The carrier plate support 7A (FIG. 1A) has an elliptical opening 9A which includes a plurality of flexible elliptical concentric rings 11aA, 11bA, 11cA and a central solid ellipse 13A which form a plurality of concentric annular openings on elongated slots 16a14 16d. Mounted within the elongated slots 16a-16d are a plurality of flexible hinges 15A (18 in number) which flexibly connect the flexible concentric rings 11aA, 11bA, 11cA and solid ellipse 13A.

The base 3A is composed of polypropylene with 10 percent oleic acid by weight, the back plate 12 is composed of impact polystyrene, and the foam pad 14 is composed of polyethelene foam.

The back plate 12 (FIGS. 3A, 5A) has a plurality of inwardly projecting extensions 18 which snap into an elliptical aperture or opening 20 (FIG. 2A) in the rear of the base 3A opposite the concentric rings 11A (FIG. 1A). The foam pad 14 (FIG. 2A) is first positioned within the elliptical opening 20 between inner projections 22, projecting from the inner wall 32 of the carrier plate support 7A which define a receiving slot between them and the inner peripheral edge of the base 3A (FIGS. 2A, 5A). The extensions 18 snap over the projections 22 (FIG. 5A) and hold the foam pad 14 in place.

The flexible concentric rings 11A (FIGS. 1A, 2A) project convexly from the surface of the carrier plate support 7A to define a space 30 (FIGS. 2A, 5A) between the rings 11A and the pad 14. Space 30 facilitates and increases the rotation of the flexible concentric rings 11A away from a snag in the hair encountered by stiff teeth 17A (FIG. 6A) as compared with the earlier embodiment in which the backing 19 (FIG. 5) somewhat restricts the rotation of the flexible concentric rings 11. The pad 14 (FIG. 5A), spaced from the concentric rings 11A by the space 30, functions to block a large depression of the teeth 17A which might lock the concentric rings 11A in an inwardly concave position -- which might occur during shipping or prolonged storage of the hairbrush 10 face downward.

The increase in number of the hinges 15A (18 in number) in the present embodiment of the invention over the smaller number of hinges 15a-15d in the earlier embodiment permits smaller hinges to be used while increasing the strength of the inter-ring connections and facilitating the molding of the base 3A by aiding in filling the center portion of the mold.

OPERATION

As with the brush 1 (FIGS. 7A-11A) of the earlier embodiment of the invention, in the present embodiment (FIGS. 1A–6A) the combination of stiff bristles 17A and the relatively movable concentric rings 11A allows the brush 10 to deeply and easily penetrate the hair while slipping past knots and snags. As can be seen from FIG. 6A, however, the space 30 from the pad 14 permits even greater rotation of the concentric rings 11A (11bA and 11cA are specifically disclosed) in a direction away from the direction of brushing. Moreover, by using more hinges 15A (18, see FIG. 1A) than the number of hinges 15 (10, see FIG. 7A) in the earlier embodiment, they are narrower and thus more flexible. Otherwise, the brush 10 of the present embodiment operates in substantially the same way as described above for the brush 1 of the earlier embodiment. Both brushes have in common: (1) a plurality of flexible concentric rings separated by elongated slots; (2) stiff teeth mounted on the concentric rings; (3) flexible hinges mounted in the elongated slots; and (4) the flexible concentric rings and flexible hinges cause the concentric rings to deflect away from the direction of brushing when stiff teeth engage snags in the hair.

In addition to the features indicated above, there will be obvious to those skilled in the art other modifications and variations which accomplish one or more of the objects of the invention and which have some or all of its advantages. However, these modifications and variations will not depart from the spirit of the invention as defined by the appended claims.

What is claimed is:
1. A hairbrush comprising:
   a plurality of flexible concentric rings separated by annular openings;
   stiff teeth mounted on said concentric rings; and
   flexible hinges bridging said openings flexibly connecting adjacent concentric rings;
   said flexible concentric rings and flexible hinges causing said concentric rings to deflect away from the direction of brushing when said stiff teeth engage snags in the hair.
2. A hairbrush as in claim 1 wherein said hinges are contrapositionally mounted connecting adjacent concentric rings.
3. A hairbrush comprising:
   a plurality of flexible concentric rings separated by annular openings;
   round-tipped stiff teeth mounted on said concentric rings; and
   hinges contrapositionally bridging said annular openings flexibly connecting adjacent concentric rings;
   said flexible concentric rings and flexible hinges allowing said concentric rings to deflect away from the direction of brushing when said round-tipped teeth engage snags in the hair.
4. A hairbrush as in claim 1 comprising a support member adapted to be hand held, said plurality of flexible concentric rings being supported by said support member.
5. A hairbrush as in claim 4 comprising a back plate removably mounted in an aperture in said support member opposite from said plurality of flexible concentric rings.
6. A hairbrush as in claim 5 comprising a pad positioned within said support member between said plurality of flexible concentric rings and said back plate.
7. A hairbrush as in claim 6 wherein said pad is positioned away from said plurality of flexible concentric rings to permit rotation of said flexible concentric rings away from the direction of brushing.
8. A hairbrush as in claim 4 wherein said support member comprises a handle and a carrier support connected to said handle.
9. A hairbrush as in claim 8 wherein said support member, plurality of flexible concentric rings, flexible hinges and stiff teeth are integral with one another.
10. A hairbrush as in claim 8 comprising a back plate removably mounted in an aperture in the carrier support opposite from said plurality of flexible concentric rings.
11. A hairbrush as in claim 10 comprising a foam pad positioned in said carrier support between said plurality of flexible concentric rings and said back plate.
12. A hairbrush as in claim 11 wherein said foam pad comprises polyethelene.

13. A hairbrush as in claim 4 wherein said support member comprises polypropolene.

14. A hairbrush as in claim 10 wherein said back plate comprises polystyrene.

15. A hairbrush as in claim 9 wherein said integral support member, plurality of flexible concentric rings, flexible hinges and stiff teeth comprise polypropolene.

16. A hairbrush as in claim 15 comprising about 10 percent oleic acid by weight.

* * * * *